United States Patent
Ryu et al.

(10) Patent No.: US 6,704,350 B1
(45) Date of Patent: Mar. 9, 2004

(54) AT-COMMAND ANALYZING DEVICE

(75) Inventors: Tadanori Ryu, Kanagawa (JP); Yasuhiro Ishizaka, Osaka (JP); Izumi Kinoshita, Hyogo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/479,889

(22) Filed: Jan. 10, 2000

(30) Foreign Application Priority Data

Jan. 13, 1999 (JP) ............................................ 11-006119

(51) Int. Cl.[7] .............................. H04B 1/38; H04L 5/16
(52) U.S. Cl. ..................... 375/222; 375/225; 375/369; 375/370; 375/296; 375/243; 375/109; 375/115
(58) Field of Search ................................ 375/222, 223, 375/224, 225, 369, 370, 355, 219, 240.27, 243, 296

(56) References Cited

U.S. PATENT DOCUMENTS

| | | | |
|---|---|---|---|
| 5,654,983 A | * 8/1997 | Sauser, Jr. | 375/225 |
| 5,737,633 A | * 4/1998 | Suzuki | 710/29 |
| 5,878,079 A | * 3/1999 | Mori | 375/225 |
| 5,923,705 A | * 7/1999 | Willkie et al. | 375/220 |
| 6,072,827 A | * 6/2000 | Krulce | 375/225 |
| 6,198,785 B1 | * 3/2001 | Flynn | 375/377 |

FOREIGN PATENT DOCUMENTS

JP 9-153923 6/1997

* cited by examiner

*Primary Examiner*—Don N. Vo
*Assistant Examiner*—Qutub Ghulamali
(74) *Attorney, Agent, or Firm*—Dickstein Shapiro Morin & Oshinsky LLP (57) ABSTRACT

A first counter measures the span of the start bit of a first character of an AT command transmitted from a DTE based on instructions from an MPU. A decoder receives a measurement result of the first counter, outputs frequency-dividing data for producing a clock for sampling the first character, and also outputs, when the rate of the start bit is more than a preset value, a flag indicating this matter. A second counter selects, in accordance with whether or not the flag has been set, the frequency-dividing data from either the decoder or the MPU, and produces the sampling clock. A shift register receives data subsequent to the start bit of the first character based on the sampling clock from the second register, holds the received data, which data is then read by the MPU.

6 Claims, 7 Drawing Sheets

FIG. 1 PRIOR ART

WHEN [AT] ARE RECEIVED

| D7 OF [A] | D7 OF [T] | FORMAT |
|---|---|---|
| 0 | 1 | 7-BIT EVEN-NUMBER PARITY |
| 1 | 0 | 7-BIT ODD-NUMBER PARITY |
| 0 | 0 | 7-BIT SPACE |
| 1 | 1 | 7-BIT MARK |

WHEN [at] ARE RECEIVED

| D7 OF [a] | D7 OF [t] | FORMAT |
|---|---|---|
| 1 | 0 | 7-BIT EVEN-NUMBER PARITY |
| 0 | 1 | 7-BIT ODD-NUMBER PARITY |
| 0 | 0 | 7-BIT SPACE |
| 1 | 1 | 7-BIT MARK |

AT-COMMAND ANALYZING DEVICE

BACKGROUND OF THE INVENTION

1. Field of the Invention

The present invention relates to a device for analyzing an AT command which is used in a modem device for personal computer.

2. Description of the Prior Art

The AT command used in a modem device for a personal computer in the prior art automatically recognizes and responds to a communication rate and a communication parameter between a DTE (Data Terminal Equipment) and a DCE (Data Circuit Terminating Equipment).

The AT command is such that the first two characters of the command are limited to 'AT' or 'at', and this is the reason why the AT command is called 'AT' command. What the AT command automatically recognizes and responds to is a communication rate and a communication parameter. An automatically recognizing method therefor will now be described.

Description will be made for the communication rate.

When 'A' or 'a' at the first of the command is expressed by ASCII code, 'A' and 'a' are expressed by 41h and 61h in hexadecimal notation, respectively. Because the least significant bit (LSB) of each of both is 1, a space (start bit) of one bit certainly appears at the beginning of the communication when each of both is converted into the LSB-first bit series of a serial interface. The communication rate is obtained as a result of measuring the time of this space.

In the times a personal-computer communication using the AT command started, the communication rate was 300 bps. However, the rate increases remarkably after that, to 14400 bps, then, 33600 bps, and, recently, 56000 bps is used. Moreover, the 56000 bps is the communication rate between a DCE and a DCE, and there is a possibility that data therebetween has been compressed to ¼ at the maximum. Therefore, for communication between a DCE and a DTE, it is necessary to satisfy the communication rate of 230.4 kbps which is the four times resulting from decompressing the thus compressed data. The standard baud rates used are 230400, 115200, 57600, 38400, 19200, 9600, 4800, 2400, 1200 and 300 bps. A difference in clock occurs between a transmission side and a reception side due to asynchronous communication. However, a frequency error of+2.5% through–1.0% is allowed with respect to a standard frequency at a rule. Therefore, when automatic setting of the rate is performed, it is necessary to detect a rate of reception from the other side, and set a frequency of a baud rate which is nearest to and supports this rate Description will be made for the above-mentioned communication parameter.

Figure 1:
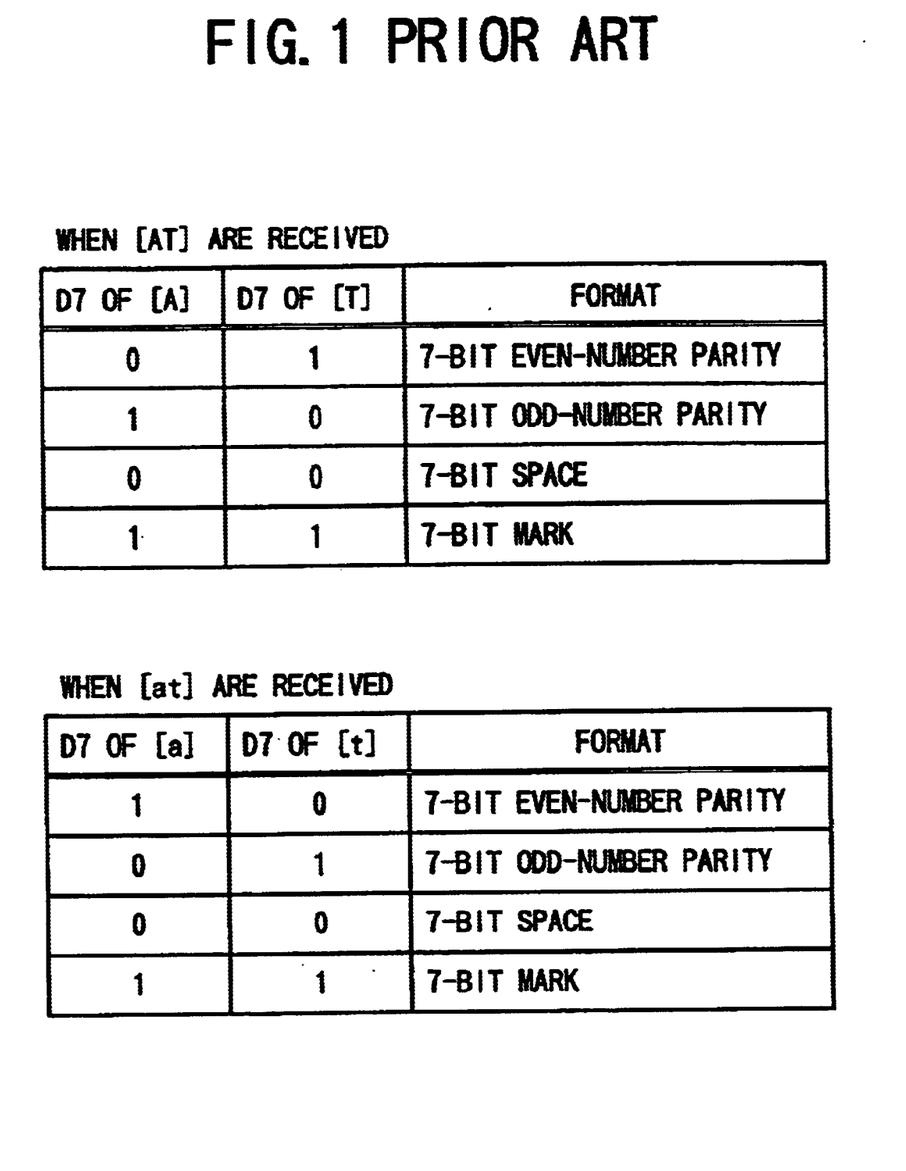
FIG. 1 shows communication parameters of AT commands.

With regard to the communication parameter, 8 bits (the start bit and 7 data bits) are set first without parity bit. The second character (T or t) is received at the communication rate obtained using the first character (A or a). Then, from a parity bit (D7) of each of the first character and second character and whether the characters are AT or at, the communication parameter which ITU-T, V.25ter supports is obtained. FIG. 1 shows these communication parameters. D7 which expresses the parity bit expresses the eighth bit when the respective bits are expressed by D0–D7 in the LSB first manner, these respective bits comprising the 7 data bits and the following parity bit. The communication parameter is also called a data format.

The AT command has been analyzed using a microprocessor unit (MPU) in the prior art. However, because the communication rate has been increased as mentioned above and various functions have come to be used, the load of the MPU has increased. Japanese Laid-Open Patent Application No. 9-153923 discloses an art for reducing the load of the MPU and for automatic recognition of the communication rate using the AT command.

Figure 2:
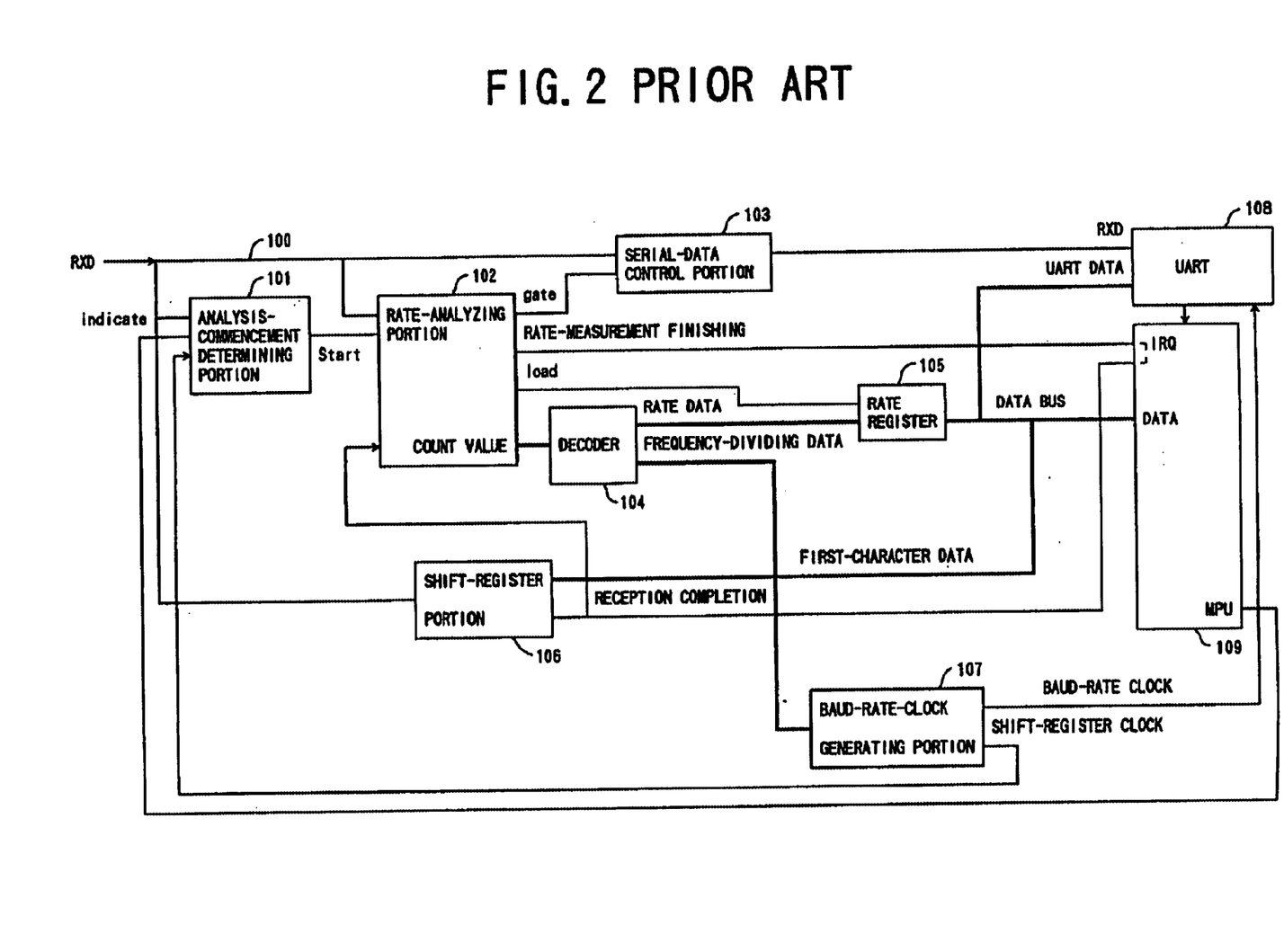
FIG. 2 is a block diagram showing an arrangement of an AT-command analyzing device in the prior art.

An AT-command analyzing device in the prior art disclosed in Japanese Laid-Open Patent Application No. 9-153923 is shown in FIG. 2, and will now be described.

In FIG. 2, RXD 100 is an input-data signal of a serial interface with a DTE. An analysis-commencement determining portion 101 receives instructions to start communication-rate analysis from a later-described MPU 109, monitors the RXD 100, and sends out a Start signal for rate-measurement commencement. A rate analyzing portion 102 receives the Start signal and analyzes the communication rate of the start bit. A serial-data control portion 103 prevents input of the RXD 100 to a later-described UART (Universal Asynchronous Receiver Transmitter) 108 during the period during which a gate signal output from the rate analyzing portion 102 is in the OFF state.

A decoder 104 generates rate data and frequency-dividing data for generating a baud-rate clock from a count value obtained as a result of the rate analyzing portion 102 counting clock pulses for the communication period of the start bit. A rate register 105 holds the rate data from the decoder 104. A shift-register portion 106 including 8-bit shift register, receives the first character of the AT command, and holds it. A baud-rate clock generating portion 107 receives the frequency-dividing data from the decoder 104, generates the baud-rate clock therefrom for receiving the command, and supplies it to the shift-register portion 106 and UART 108. The UART 108 is a transmission and reception circuit which transmits and receives the RXD 100 which is asynchronous transmission serial data.

The MPU 109 outputs an indicate signal to the analysis-commencement determining portion 101, and gives it the instructions to start communication-rate analysis. The MPU 109 receives the first character from the shift-register portion 106, determines that it is 'A', receives received data starting from the second character and analyzes it. The analysis-commencement determining portion 101 determines that the ON state of the indicate signal from the MPU 109 is the instructions to start communication-rate analysis, and determines that no command has been provided, when a steady state in which the logic (H or 1) inverse to the logic (L or 0) of the start bit continues for more than ten periods of the shift-register clock (corresponding to the total 10 bits of the start, stop bits, parity bit and 7 data bits) in the RXD 100 which has been monitored. Then, the analysis-commencement determining portion 101 causes the Start signal to be in the ON state provided to the rate analyzing portion 102, and causes it to start communication-rate analysis.

The rate analyzing portion 102 causes the gate signal to be in the OFF state, monitors the RXD 100 and waits for the start bit. The serial-data control portion 103 disconnects the UART 108 from the RXD 100 during the period during which the gate signal is in the OFF state, and, thereby, prevents the UART 108 from receiving the first character of the AT command at an erroneous communication rate before the rate is set. When the start bit appears in the RXD 100, the rate analyzing portion 102 causes an internal counter to start, and measures the time of the start bit. Then, when the start bit finishes, the rate analyzing portion 102 causes the internal clock to stop, causes a load signal to be in the ON state, and provides a rate-measurement-completion interrupt signal to the MPU 109.

The rate data includes the value of the rate calculated from the count value of the rate analyzing portion 102 and an error bit which is used, when the rate measurement has ended in failure, to report this matter. The rate register 105 holds the rate data from the decoder 104 at the time the load signal from the rate analyzing portion 102 comes to be in the ON state. The baud-rate-clock generating portion 107 loads therein the frequency-dividing data from the decoder 104 at the time the load signal from the rate analyzing portion 102 comes to be in the ON state, generates a new baud-rate clock based on this frequency dividing data, and supplies it to the UART 108. Thereby, the UART 108 continually has the clock suitable to the communication rate supplied thereto. Further, the baud-rate-clock generating portion 107 supplies the shift-register clock having the same frequency as that of the baud-rate clock for 8 periods thereof to the shift-register portion 106.

The shift-register portion 106 receives the 8 bits including the 7 data bits starting after the start bit of the first character of the command and the parity bit thereof in timing of the shift-register clock supplied from the baud-rate-clock generating portion 107. Then, when reception of the 8 bits has finished, the shift-register portion 106 causes a first-character reception completion signal to be in the ON state, and causes interrupt in the MPU 109. When this reception completion signal has come to be in the ON state, the rate analyzing portion 102 causes the gate signal to be in the ON state. When the gate signal has come to be in the ON state, the RXD 100 is input to the UART 108. Thereby, the UART 108 does not affected by the first character, and, as a result, can receive the second character and the following characters of the AT command positively.

The UART 108 receives the second character and following characters of the AT command in sequence in timing of the baud-rate clock supplied by the baud-rate-clock generating portion 107, and causes reception interrupt in the MPU 109 at every character. When the MPU 109 receives the rate-measurement completion interrupt signal from the rate analyzing portion 102, reads the rate data from the rate register 105, determines from the error bit whether or not the rate measurement has ended successfully, and recognizes the value of the measured rate when the measurement has ended successfully.

Then, when receiving the reception completion interrupt from the shift-register portion 106, the MPU 109 reads the first character of the command and the parity bit thereof, and determines whether the character is 'A' or 'a'. When the rate measurement ended in failure or the first character is neither 'A' nor 'a', the MPU 109 causes the indicate signal to be in the ON state, and performs the rate analysis again from the beginning. The MPU 109 receives the second character and following characters of the AT command through the UART 108. After receiving the reception interrupt from the UART 108, the MPU 109 reads the received data, and determines the data format of the received data from the parity bit of the first character and the parity bit of the second character when the second character is 'T' or 't'. The MPU 109 sets the UART 108 in this data format, and the UART 108 receives the third character and following characters of the AT command in sequence.

In the above-described AT-command analyzing device in the prior art, in addition to the transmitting and receiving means (UART) 108 and control means (MPU) 109, the rate analyzing portion 102 which analyzes the communication rate in response to the instructions from the MPU 109, the baud-rate-clock generating portion 107 which generates the baud-rate clock from the analyzed communication rate, transmits it to the UART 108 and reports the communication rate, and the shift-register portion 106 which inputs thereto this baud-rate clock and receives the first character are provided. Thereby, such functions as those of analyzing the communication rate, reporting of the communication rate to the UART 108, receiving the first character, which have been performed by the MPU 109 in the further prior art, are performed by the peripheral circuits such as the rate analyzing portion 102, baud-rate-clock generating portion 107, shift-register portion 106 and so forth. As a result, the load of the MPU 109 is reduced.

As described above, in this prior art, in order to reduce the load of the MPU which recognizes the AT command and controls a modem, hardware is used for performing all the functions ended at the generation of the baud rate.

Because the communication rate has been increased, the method of performing the analysis of the rate of the AT command and setting of the baud rate not by the MPU but by the peripheral hardware circuits is used in this prior art. However, it is necessary to support many rates of 300 through 230.5 kbps. Therefore, in comparison to the control method using software of the MPU in the further prior art, the circuit control for the AT-command analysis is needed, the decoding circuit for determining the baud rate is needed, and so forth. Thereby, the circuit arrangement is complicated, and the size of the circuit is large.

Further, the baud rate of the UART 108 is output from the baud-rate-clock generating portion 107, and is reset only after the rate of the AT command is analyzed. In this arrangement, in a case where the AT command is not received, for example, in a case where a ring of telephone comes, when the modem detects it, the modem needs to send the characters of the ring to the DTE. In this case, the MPU 109 needs to set the UART 108 in a baud rate which has been set using an internal parameter, and to cause the UART 108 to operate. However, these functions cannot be performed in the above-described method in the prior art.

Further, with regard to the first character, the character is checked by the MPU after the 8 bits are sampled. When the first character is neither 'A' nor 'a', it is necessary to receive the subsequent character as the first character. However, in a case of high-rate data, this determination may be delayed due to use of software, and, thereby, there is a possibility that the subsequent character cannot be received properly. Further, in asynchronous communication, when an abnormal frame character which does not have the stop bit is generated, because the stop bit is not checked in this prior art, it is not possible to recognize this character to be an erroneous character.

SUMMARY OF THE INVENTION

The present invention has been devised in consideration of the above-described problems. An object of the present invention is to reduce the size and complexity of the peripheral circuit when the rate of the AT command is analyzed. Another object of the present invention is to provide an error detecting function for immediately detecting the error that the first character is neither 'A' nor 'a'.

Further, another object of the present invention is to enable using of a circuit provided for analyzing the rate of the AT command as a circuit for performing another function in a modem, and, thereby, to prevent increase in size of the entire circuit.

An AT-command analyzing device, according to the present invention, comprises:

a transmitting and receiving portion (UART 6) which receives asynchronous transmission serial data based on a baud-rate clock from a DTE;

a control portion (MPU 9) which analyzes the data received by the transmitting and receiving portion;

a baud-rate generating portion (8) which generates the baud-rate clock to be output to the transmitting and receiving portion in accordance with instructions from the control portion;

a measuring portion (first counter 1) which measures the span of the start bit of the first character of an AT command transmitted from the DTE based on instructions from the control portion;

a rate analyzing portion (decoder 2) which receives a measurement result of the measuring portion, outputs frequency-dividing data for producing a clock for sampling the first character, and also outputs, when the rate of the start bit is more than a preset value, a flag indicating this matter;

a sampling-clock generating portion (second counter 3) which selects, in accordance with whether or not the flag is present, the frequency-dividing data from either the rate analyzing portion or the control portion, and produces a sampling clock; and a shift-register portion (shift register 5) which, as a result of the flag being present or instructions being provided from the control portion, receives data subsequent to the start bit of the first character based on the sampling clock from the sampling-clock generating portion, and holds the received data, which data is then read by the control portion.

It is preferable that the shift-register portion checks, each time when sampling a bit, whether or not the first character is 'A' or 'a' which corresponds to 41H or 61H in hexadecimal notation, and, when determining that the first character is neither 'A' nor 'a', stops the sampling operation and outputs a flag indicating an error to the control means.

Further, it is preferable that the shift-register portion stops a sampling operation when, before sampling a bit subsequent to the start bit, the level of the received data of the bit subsequent to the start bit changes from high to low, and outputs a flag indicating an error to the control means.

Furthermore, it is preferable that the shift-register portion attempts to sample, after sampling the 8 bits subsequent to the start bit, the following stop bit, and, when being not able to detect the stop bit, outputs a flag indicating an error to the control means.

Further, it is possible that the sampling-clock generating portion can operate in a one-shot-pulse outputting operation mode other than a sampling-clock generating mode, whether the sampling-clock generating portion operates in the one-shot-pulse outputting operation mode or the sampling-clock generating mode can be determined in accordance with instructions from the control portion, and the sampling-clock generating portion can output a one-shot pulse as an interrupt signal of the control portion in the one-shot-pulse outputting operation mode.

As described above, in the AT-command analyzing device according to the present invention, setting of the baud rate of the transmitting and receiving portion (UART) after the analysis of the rate of the AT command and so forth are performed by the control portion (MPU). Based on the count value obtained from measuring the span of the start bit, the clock rate of the sampling clock for sampling the first character of the AT command is automatically set by the peripheral circuits or set by the control portion (MPU). Whether the clock rate of the sampling clock for sampling the first character of the AT command is automatically set by the peripheral circuits or set by the control portion (MPU) is determined from the rate of the AT command obtained based on the count value resulting from measurement of the span of the start bit.

According to the present invention, in comparison with the prior art in which all the operations are performed through the circuit control, because the analysis of the rate of the AT command, which rate is so low that the rate can be analyzed through control by the software of the control portion (MPU) sufficiently, and the setting of clock generation for sampling the first character of the AT command performed after that are performed by the software of the control portion (MPU). On the other hand, the analysis of the rate of the AT command, which rate is so high that the rate analysis cannot be controlled by the software of the control portion (MPU) sufficiently, and the setting of clock generation for sampling the first character of the AT command performed after that are performed by the peripheral circuits. Thereby, it is possible to reduce the size and complexity of the entire circuit.

Other objects and further features of the present invention will become more apparent from the following detailed description when read in conjunction with the accompanying drawings.

DETAILED DESCRIPTION OF THE PREFERRED EMBODIMENT

Figure 3:
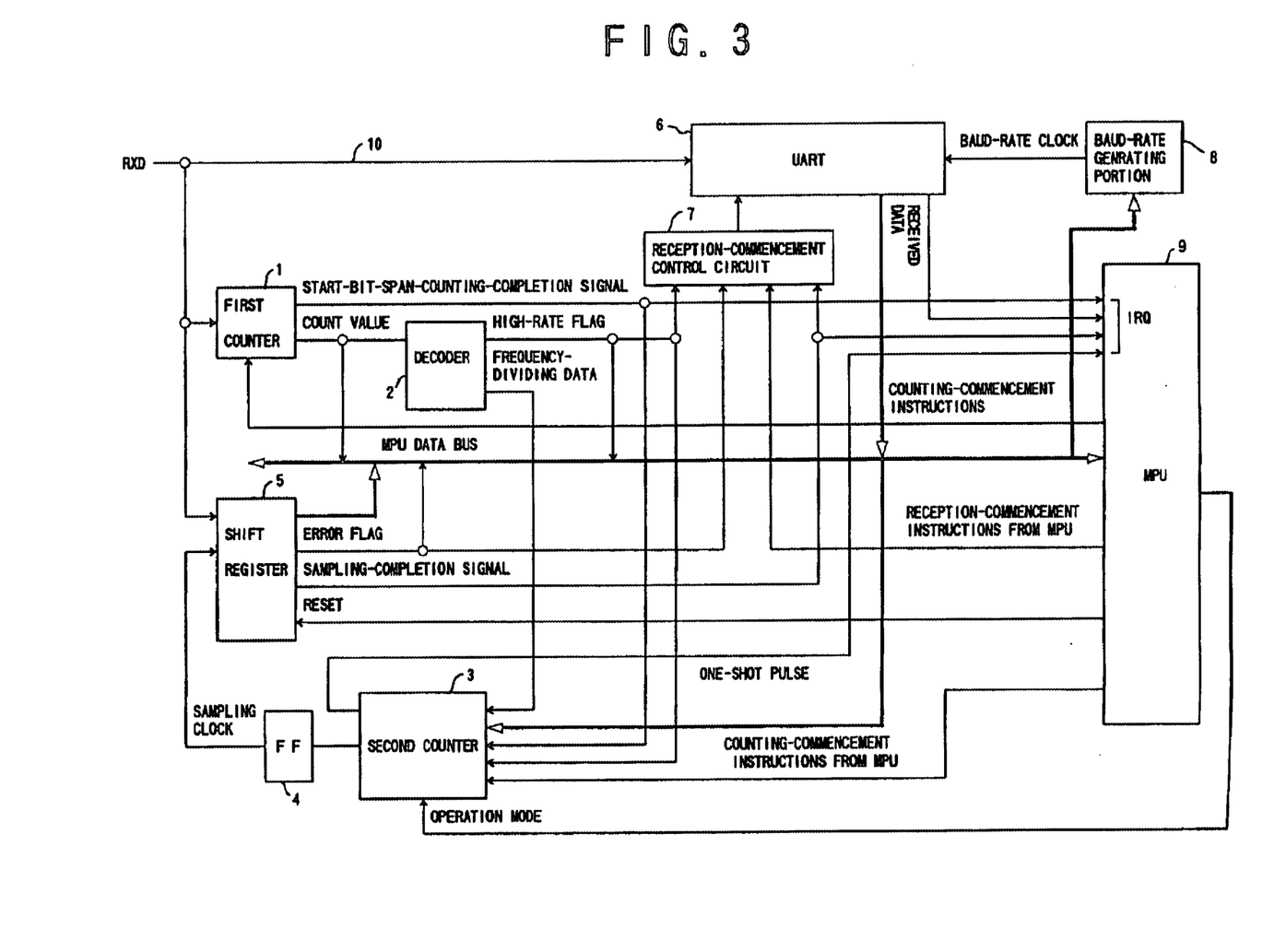
FIG. 3 is a block diagram showing an arrangement of an AT-command analyzing device in an embodiment of the present invention.

An embodiment of the present invention will now be described in accordance with drawings. FIG. 3 is a block diagram showing an AT-command analyzing device in the embodiment of the present invention.

In this embodiment, a first counter 1, a second counter 3 and a baud-rate generating portion 8 operate at a clock frequency of 3.6864 MHz.

The first counter 1 acting as a measuring portion is a counter which measures the span of the low period of the start bit of the first character of the AT command using received data transmitted through an RXD line 10 (serial line). The first counter 1 counts pulses of the clock for the low period starting from the time the level the received data decays, outputs the thus-obtained count value to an MPU data bus and a decoder 2, and outputs a counting-completion interrupt signal to an MPU 9. In a case of the highest baud rate of 230.4 kbps, the count value of the start bit of the first counter 1 is 10H. However, when considering the allowable value of the frequency error, there is a possibility that this count value varies in the range of 0FH through 11H. Further, when considering various conditions such as the characteristics of starting and stopping, and circuit delay of the circuits to be used, it is necessary to consider that this count value may vary in the range of 0EH through 12H.

The decoder 2 acting as a rate analyzing portion sets a high-rate flag when the count value of the first counter 1 is equal to or less than 6FH, obtains, from this count value, frequency-dividing data for generating a sampling clock, and outputs it. The frequency-dividing data is used for generating a clock having the frequency twice the support baud rate which is nearest to the baud rate of the received data.

The decoder 2 has a rounding function of, when a value is in a certain range, rounding this value to a fixed value and outputting it, such as to, when the count value is in the range of 0EH through 12H, output 08H for generating the frequency twice 230.4 kbps. In order to output a fixed value when a value is in a certain range, a method of using a table can be considered other than such a rounding function. In this embodiment, rounding is performed as a result of adding 6 to the count value, causing each of the three least significant bits to be 0 and dividing the thus-obtained data by 2. In this rounding method, in comparison to the method of referring to a table, the amount of necessary circuits can be reduced, and the rounding method can be easily performed. In the above-mentioned example, when the count value is in the range of 0AH through 19H, 08H is output, and is the value which performs frequency dividing so as to obtain the clock having the frequency twice 230.4 kbps. Further, when the count value is in the range of 5AH through 69H, 80H (48) is output, and is the value which performs frequency dividing so as to obtain the clock having the frequency twice 38.4 kbps. When frequency dividing by 48 is performed on 3.6864 MHz, 76.8 kHz is obtained.

In a case of a low rate of 19.2 kbps, the count value of the first counter 1 exceeds 6FH, and, as a result, the high-rate flag is not set by the decoder 2. Further, because the rounding processing in the case of a low rate does not cope with the allowable error, it is not possible to use the data obtained through the rounding function as the frequency-dividing data. Although it is possible to provide a decoder circuit designed for all the supporting baud rates, it is not possible to avoid the circuit being complicated and enlarged in this case.

The second counter 3 acting as a sampling-clock generating portion operates at the clock frequency of 3.6864 MHz as mentioned above. When the count completion signal is given to the second counter 3 and the high-rate flag has been set by the decoder 2, the second counter 3 loads therein the frequency-dividing data from the decoder 2, automatically operates, and performs frequency dividing on the clock. The clock which is obtained through the frequency dividing has, consequently, the frequency twice the frequency of the measured baud rate. The reason why the clock having the frequency twice the measured baud rate is produced is that frequency dividing by 2 is performed on the thus-obtained clock by a flip-flop 4, and thus the clock for sampling each bit of the received data at the center thereof is produced. Because the rate of the received data has the allowable error as described above, when each bit of the received data is sampled at an end portion thereof, the timing errors due to the difference between the frequency of the received data and the sampling frequency are accumulated while the 8 bits are being sampled, and, as a result, there is a possibility that sampling is performed in erroneous timing. In order to avoid such a situation, it is preferable to sample each bit of the received data at the center thereof.

When the high-rate flag has not been set by the decoder 2, the second counter 3 does not operate, the frequency-dividing data is set in accordance with instructions from MPU 9 acting as a control portion, and, then, the second counter 3 begins to operate. The flip-flop 4 performs the frequency dividing by 2 on the frequency-divided clock from the second counter 3, and outputs the sampling clock for a shift register 5.

Figure 4:
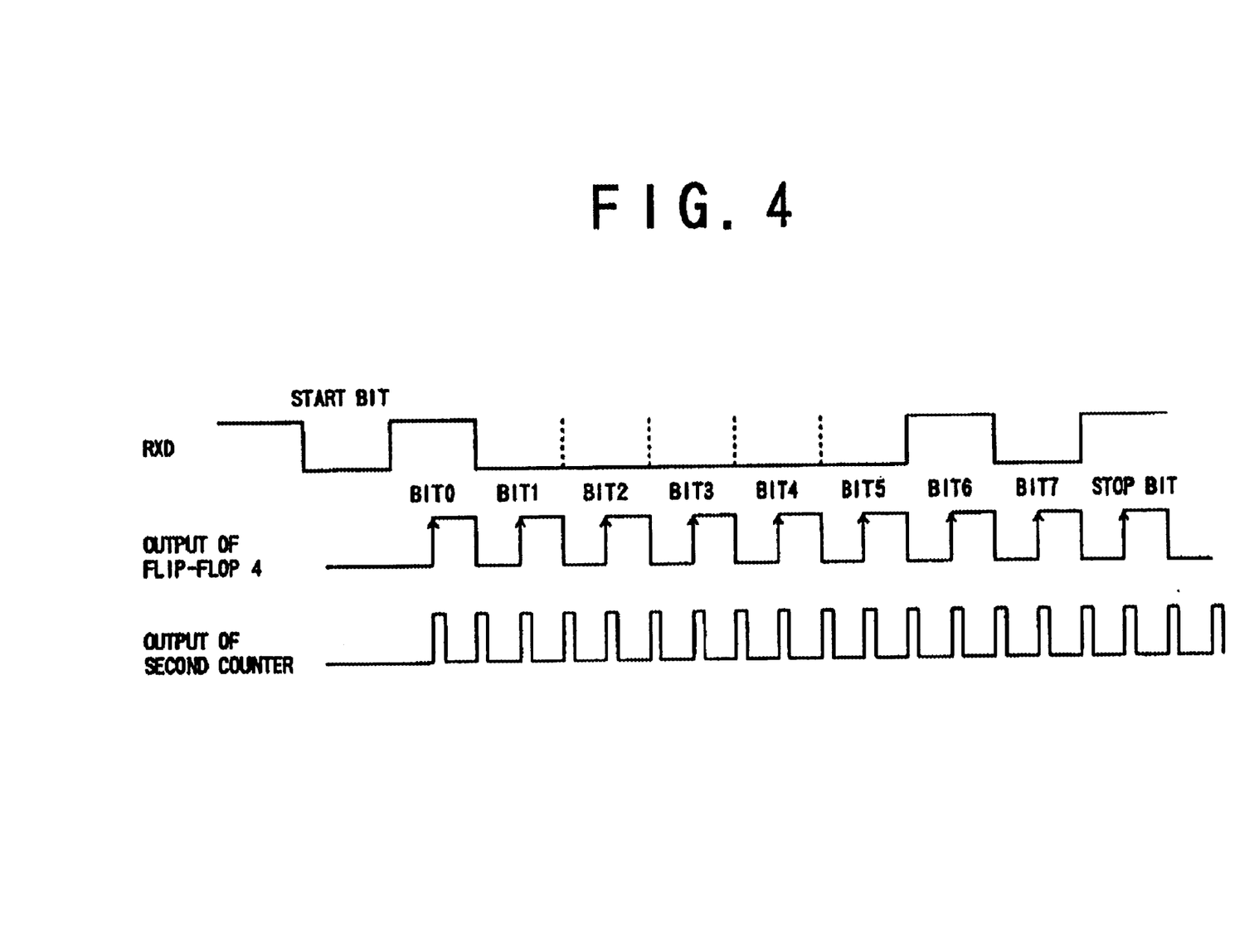
FIG. 4 is a timing chart showing received data, and output timing of a second counter and a flip-flop of the AT-command analyzing device shown in FIG. 3.

FIG. 4 shows the received data, timing of output of the second counter 3 and output of the flip-flop 4.

As shown in FIG. 4, the flip-flop 4 performs frequency dividing on the frequency-divided clock provided from the second counter 3, the output of the flip-flop 4 is provided to the shift register 5 as the sampling clock thereof, and the signal transmitted through the RXD line 10 is sampled by the shift register 5.

The second counter 3 operates in either one of two operation modes. One of the two operation modes is an ordinary frequency-dividing counting mode, and the other is a one-shot-pulse outputting mode of outputting one-shot pulse after counting pulses of the clock so as to obtain a specified count value. When analysis of the AT command is performed, the MPU 9 sets the first mode of performing frequency dividing on the clock, and, then, when the command processing operation of the AT command is performed, the MPU 9 sets the one-shot-pulse outputting mode. Thereby, it is possible to use the second counter 3 for another purpose. For example, in pulse-dialing processing, it is necessary to precisely maintain the duty of pulses. For this purpose, it is possible to perform management of on-hook and off-hook times as a result of causing an interrupt signal to be output in the one-shot pulse outputting operation of the second counter 3 in the second mode to the MPU 9.

Figure 6:
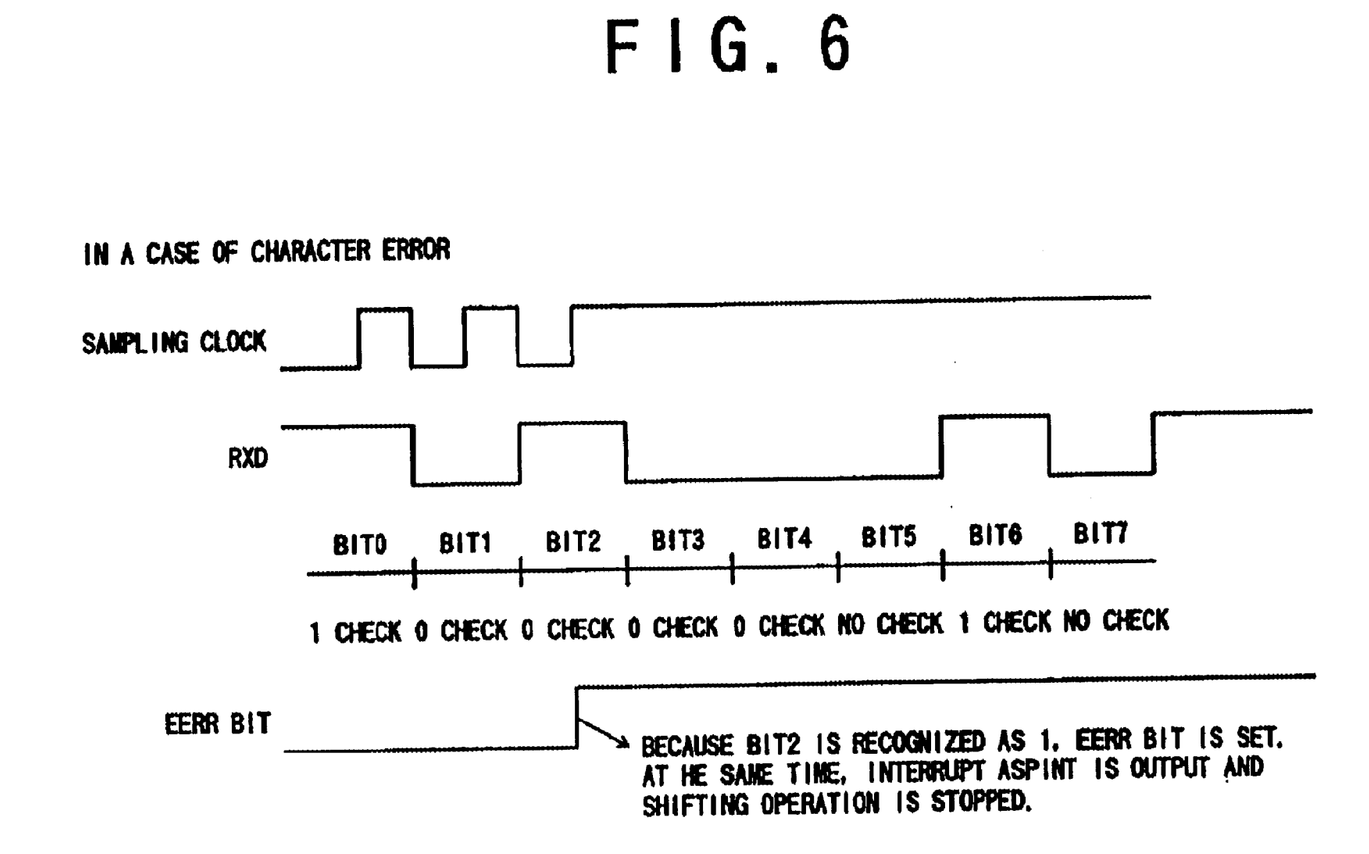
FIG. 6 is a timing chart at a time of occurrence of a character error of the AT-command analyzing device shown in FIG. 3.

The shift register 5 samples the signal transmitted through the RXD line 10 as 8-bit data using the sampling clock from the flip-flop 4, and holds the thus-sampled data. Further, the shift register 5 checks, for each bit, whether or not the sampled data corresponds to the character 'A' or 'a' (41H or 61H in hexadecimal notation). When determining that the sampled data does not correspond to the character 'A' or 'a', the shift register 5 stops sampling, and sets an error flag. For example, as shown in FIG. 6, when recognizing the bit 2 of the data sampled by the shift register 5 as 1, because this bit is different from the bit of the character 'A' or 'a', the shift register 5 determines that a character error occurs, sets an error (EERR) bit and provides the error flag to the MPU 9. Further, at the same time as that of the above-described operations, the shift register 5 outputs an interrupt signal (ASPINT), provides the interrupt signal to the MPU 9 and stops the shifting operation.

Figure 7:
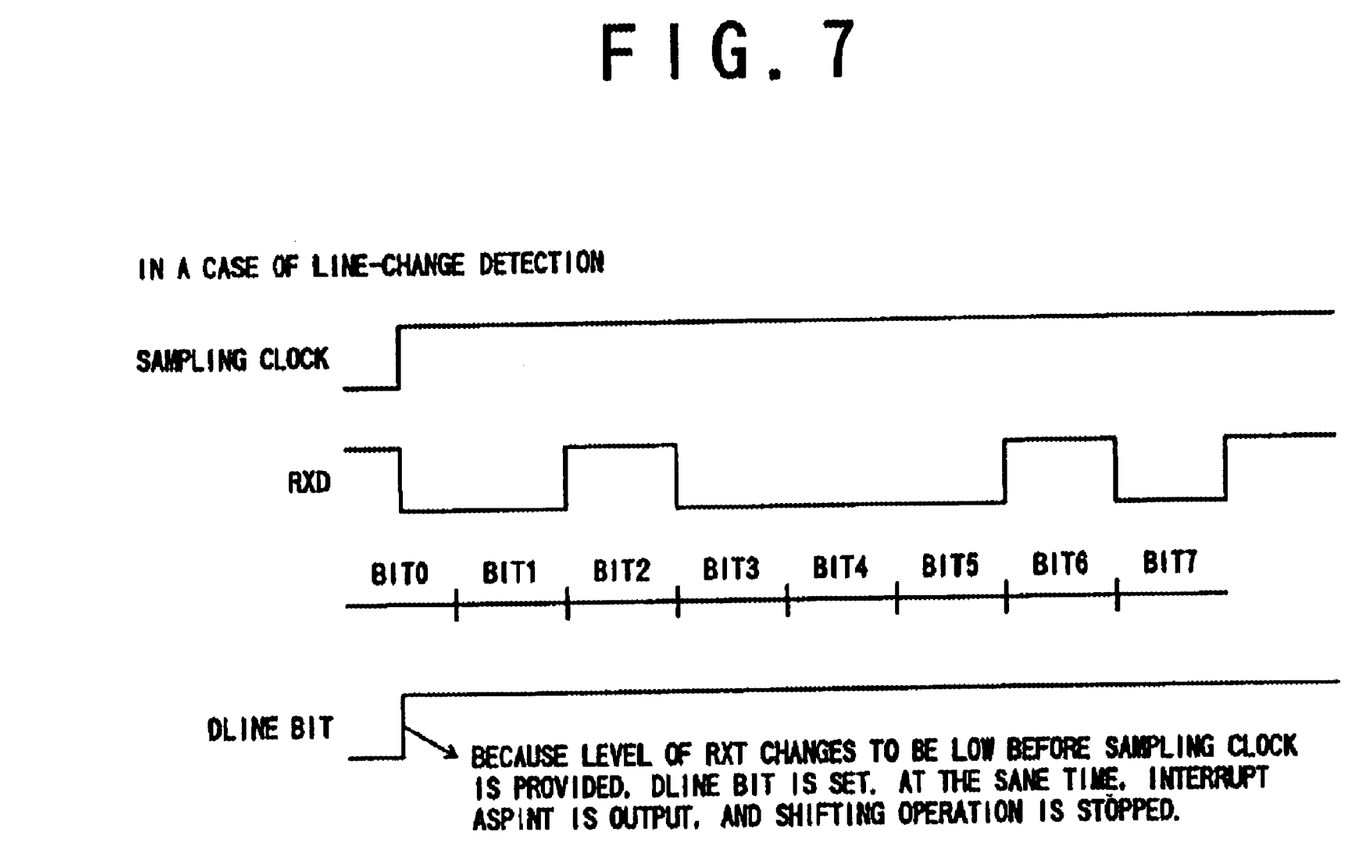
FIG. 7 is a timing chart at a time of detection of line change of the AT-command analyzing device shown in FIG. 3.

Further, when the received signal changes from the high level to the low level before the sampling clock output from the second counter 3 is first provided to the shift register 5, the shift register 5 sets the error flag, and stops sampling. That is, because change in the level of the signal transmitted through the RXD line 10 does not occur before the sampling clock is first provided to the shift register 5 in the normal operation, when the level of the signal transmitted through the RXD line 10 changes into the low level before the sampling clock is first provided, as shown in FIG. 7, the shift register 5 sets an error (DLINE) bit, and provides the error flag to the MPU 9. Further, at the same time as that of the above-described operations, the shift register 5 outputs the interrupt signal (ASPINT), provides the interrupt signal to the MPU 9, and stops the shifting operation.

Further, the shift register 5 determines whether or not the stop bit appearing after the sampling of the 8 bits is finished is detected. When the stop bit is not detected, the shift register 5 determines that an error occurs, and performs processing the same as the above-described one. When the sampling is finished (including finish due to an error), the shift register 5 outputs an interrupt signal to the MPU 9.

A reception-commencement control circuit 7 enables a receiving operation of a UART 6 when the error flag has not been set by the shift register 5 at the time the sampling-completion interrupt signal is generated in the case where the high-rate flag has been set. When the high-rate flag has not been set, the receiving operation of the UART 6 is enabled in response to reception-commencement instructions from the MPU 9.

A baud-rate generating portion 8 generates a baud rate only in accordance with instructions from the MPU 9, and provides a baud-rate clock to the UART 6. Because the baud rate should be set by the completion of sampling of the first character of the AT command, the setting of the baud rate can be performed through interrupt processing by the MPU 9 sufficiently. As a result, the decoder 2 does not need to output baud-rate data, and, thereby, it is possible to reduce the size of the decoder 2 in comparison to the decoder in the prior art.

The above-mentioned UART 6 starts receiving the second character and following characters of the AT command from the RXD line 10 in response to instructions from the reception-commencement control circuit 7 or MPU 9.

Figure 5:
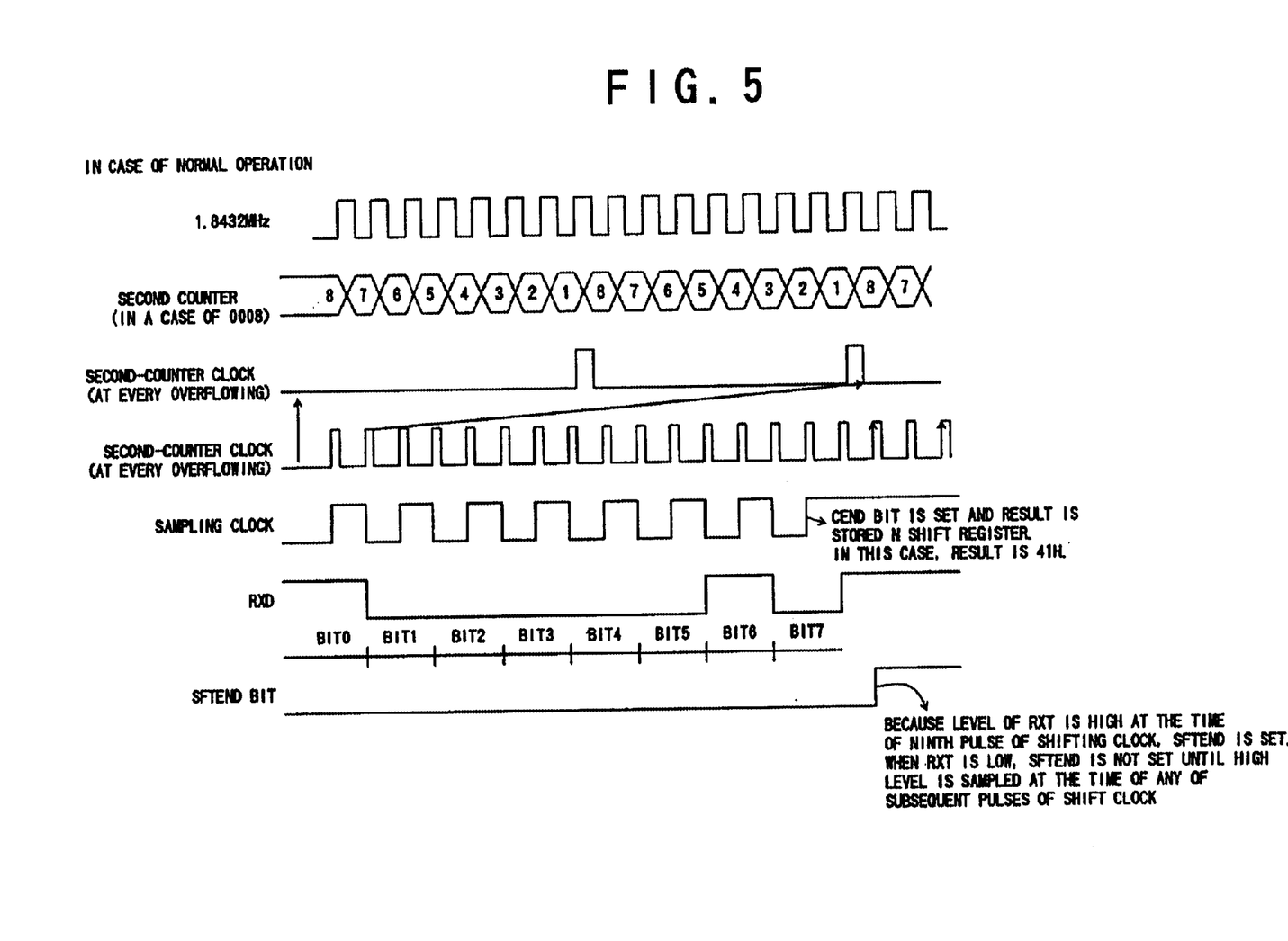
FIG. 5 is a timing chart at a time of normal operation of the AT-command analyzing device shown in FIG. 3.

Actual operation will now be described with reference to FIG. 5 for the case where the rate of the AT command is high (19.2 kbps through 230.4 kbps) and for the case where the rate of the AT command is less than the above-mentioned range, separately. FIG. 5 is a timing chart showing a condition when the operation is normally performed.

First, description will be made for the case of high rate.

The MPU 9 performs initial setting of the first counter 1, second counter 3 and so forth, and, then, provides instructions to start counting to the first counter 1. The first counter 1 checks the data transmitted through the RXD line 10, counts pulses of the clock for the span of the start bit of the data, and outputs the thus-obtained count value and a counting-completion signal. The decoder 2 obtains the frequency-dividing data from the count value from the first counter 1, outputs it, and sets the high-rate flag. In the example shown in FIG. 5, the second counter 3 operates at the clock frequency of 1.8432 MHz, the frequency-dividing data of 0008 is output from the decoder 2, and, as a result, the second counter 3 outputs one pulse each time when counting 8 pulses of the clock.

Because the high-rate flag has been set, the second counter 2 automatically loads therein the frequency-dividing data from the decoder 2, performs the frequency-dividing operation using the thus-loaded frequency-dividing data, and outputs the frequency-divided clock to the flip-flop 4. Then, the flip-flop 4 performs frequency dividing by 2 on the frequency-divided clock, and the thus-obtained sampling clock is output to the shift register 5.

The shift register 5 samples the 8 bits of the received data, and, when detecting the stop bit, sets a CEND bit, stops the sampling operation, and stores the result thereof in the shift register 5. In the example of FIG. 5, the result stored in the shift register 5 is 41H. Then, when the level of the RXD line 10 is high at the time of a subsequent pulse of a shifting clock, that is, the ninth pulse of the shifting clock in the example of FIG. 5, the shift register 5 sets the sampling-completion signal (SFEND), and outputs the sampling-completion signal to the MPU 9. When the level of the RXD line 10 is low at the time of the ninth pulse of the shifting clock, the sampling-completion signal is not set until the high level of the RXD line 10 is sampled at the time of any of subsequent pulses of the shifting clock.

The reception-commencement control circuit 7 enables the receiving operation of the UART 6 when the high-rate flag has been set, the sampling-completion signal has been output, and no error has occurred in the sampling.

When receiving the interrupt signal of counting completion from the first counter 1, the MPU 9 checks in an interrupt routine whether or not the high-rate flag has been set. When the high-rate flag has been set, the MPU 9 determines the baud rate from the count value of the first counter 1, sets the baud rate in the baud-rate generating portion 8, and supplies a baud-rate clock to the UART 6 through the baud-rate generating portion 8. When receiving the interrupt signal of sampling completion from the shift register 5, the MPU 9 checks in an interrupt routine whether or not the error flag of sampling has been set. When the error flag has not been set, the MPU 9 recognizes that the processing finished normally, and reads the data held by the shift register 5. When an error occurred, the MPU 9 performs the initial setting again, and wait for the first character of the AT command.

Then, description will be made for the case of low rate.

The MPU 9 performs initial setting of the first counter 1, second counter 2 and so forth, and, then, provides the instructions to start counting to the first counter 1. The first counter 1 checks the data transmitted through the RXD line 10, counts pulses of the clock for the span of the start bit, and outputs the thus-obtained count value and the counting-completion interrupt signal. The decoder 2 outputs the frequency-dividing data obtained from the count value from the first counter 1, but does not set the high-rate flag. Because the high-rate flag has not been set, the second counter 3 does not perform the frequency-dividing operation using the frequency-dividing data provided from the decoder 3, but performs the frequency-dividing operation using frequency-dividing data in accordance with instructions from the MPU 9. Based on the frequency-dividing data from the MPU 9, the second counter 3 obtains the frequency-divided clock and outputs the sampling clock of the shift register 5 via the flip-flop 4. The shift register 5 samples the 8 bits of the received data, stops the sampling operation when detecting the stop bit, and outputs the sampling-completion signal to the MPU 9. Because the high-rate flag has not been set, the receiving-commencement control circuit 7 does not operate.

When receiving the interrupt signal of counting completion from the first counter 1, the MPU 10 checks in the interrupt routine whether or not the high-rate flag has been set. Because the high-rate flag has not been set in this case of low rate, the MPU 9 determines the baud rate from the count value of the first counter 1, sets the frequency-dividing data in the second counter 3 from the MPU 9, and provides instructions to start operation to the second counter 3. Further, the MPU 9 sets the baud rate in the baud-rate generating portion 8, and supplies the baud-rate clock to the UART 6 through the baud-rate generating portion 8. When receiving the interrupt signal of sampling completion from the shift register 5, the MPU 9 checks in the interrupt routine whether or not the error flag of sampling has been set. When the error flag has not been set, the MPU 9 recognizes that the processing finished normally, and reads the data held by the shift register 5. Then, the MPU 9 enables the receiving operation of the UART 6. When an error occurred, the MPU 9 performs the initial setting again, and wait for the first character of the AT command.

Thus, according to the present invention, because the AT-command analyzing device can operates in two modes, in one of which the AT-command analyzing device operates through the peripheral circuits, and, in the other of which the software of the control portion (MPU) controls the operation of the AT-command analyzing device. Appropriate one of these two modes is selected depending on the rate of the AT command. Thereby, in comparison with the case where all the operations are performed by the circuits, it is possible to reduce the size and complexity of the entire circuit.

Further, the frequency-dividing data from the decoder should be merely that corresponding to baud rates which support some high rates. As a result, the decoder can be formed of the simple rounding circuit, thereby the circuit size being able to be reduced.

Furthermore, the counter provided for the analysis of the AT command can operate in the different operation mode. Thereby, when the command processing operation of the AT command is performed, the same counter can be used in the different mode for another purpose. As a result, it is possible to reduce the size of the entire circuit.

Furthermore, according to the present invention, error check at the time of sampling is performed at every bit, and, thereby, error check can be performed while the 8-bit sampling is being performed. Thereby, when an error occurs, it is possible to prepare for receiving a subsequent character without wasting time. Furthermore, although error processing of a character having no stop bit is not performed in the prior art, detection of such an error character can be performed according to the present invention. As a result, it is possible to reduce abnormal-character erroneous receiving operations.

The present invention is not limited to the above-described embodiment and variations and modifications may be made without departing from the scope of the present invention.

The present application is based on Japanese priority application No. 11-006119, filed on Jan. 13, 1999, the entire contents of which are hereby incorporated by reference.

What is claimed is:

1. An AT-command analyzing device, comprising:

a transmitting and receiving portion which receives asynchronous transmission serial data based on a baud-rate clock from a DTE;

a control portion which analyzes the data received by said transmitting and receiving portion;

a baud-rate generating portion which generates the baud-rate clock to be output to said transmitting and receiving portion in accordance with instructions from said control portion;

a measuring portion which measures the span of the start bit of the first character of an AT command transmitted from said DTE based on instructions from said control portion;

a rate analyzing portion which receives a measurement result of said measuring portion, outputs frequency-dividing data for producing a clock for sampling the first character, and also outputs, when the rate of the start bit is more than a preset value, a flag indicating the rate of the start bit is more than a preset value;

a sampling-clock generating portion which selects, in accordance with whether or not said flag has been set, the frequency-dividing data from either said rate analyzing portion or said control portion, and produces the sampling clock; and a shift-register portion which receives data subsequent to the start bit of the first character based on the sampling clock from said sampling-clock generating portion, and holds the received data, which data is then read by said control portion.

2. The AT-command analyzing device as claimed in claim 1, wherein said shift-register portion checks, each time when sampling a bit, whether or not the first character is 'A' or 'a' which corresponds to 41H or 61H in hexadecimal notation, and, when determining that the first character is neither 'A' or 'a', stops the sampling operation and outputs a flag indicating an error to said control means.

3. The AT-command analyzing device as claimed in claim 1, wherein said shift-register portion stops a sampling operation when, before sampling a bit subsequent to the start bit, the level of the received data of said bit subsequent to the start bit changes from high to low, and outputs a flag indicating an error to said control means.

4. The AT-command analyzing device as claimed in claim 1, wherein said shift-register portion attempts to sample, after sampling the 8 bits subsequent to the start bit, the following stop bit, and, when being not able to detect the stop bit, outputs a flat indicating an error to said control means.

5. The AT-command analyzing device as claimed in claim 1, wherein said sampling-clock generating portion can operate in a one-shot-pulse outputting operation mode other than a sampling-clock generating mode, whether said sampling-clock generating portion operates in said one-shot-pulse outputting operation mode or said sampling-clock generating mode can be determined in accordance with instructions from said control portion, and said sampling-clock generating portion can output a one-shot pulse as an interrupt signal of said control portion in said one-shot-pulse outputting operation mode.

6. An AT-command analyzing device, comprising:

a transmitting and receiving portion which receives asynchronous transmission serial data based on a baud-rate clock from a DTE;

a control portion which analyzes the data received by said transmitting and receiving portion;

a baud-rate generating portion which generates the baud-rate clock to be output to said transmitting and receiving portion in accordance with instructions from said control portion;

a measuring portion, including first and second counters, which measures the span of the start bit of the first character of an AT command transmitted from said DTE by counting continuously from a starting transition of the start bit based on instructions from said control portion;

a rate analyzing portion which receives a measurement result of said measuring portion, outputs frequency-dividing data for producing a clock for sampling the first character, and also outputs, when the rate of the start bit is more than a preset value, a flag indicating the rate of the start bit is more than a preset value;

a sampling-clock generating portion which selects, in accordance with whether or not said flag has been set, the frequency-dividing data from either said rate analyzing portion or said control portion, and produces the sampling clock; and a shift-register portion which receives data subsequent to the start bit of the first character based on the sampling clock from said sampling-clock generating portion, and holds the received data, which data is then read by said control portion.

\* \* \* \* \*